United States Patent
Chang et al.

(10) Patent No.: US 6,895,010 B1
(45) Date of Patent: May 17, 2005

(54) APPARATUS AND METHOD FOR TRANSMITTING AND RECEIVING DATA ACCORDING TO RADIO LINK PROTOCOL IN A MOBILE COMMUNICATIONS SYSTEMS

(75) Inventors: Hoon Chang, Seoul (KR); Hyun-Seok Lee, Songnam-shi (KR); Dae-Gyun Kim, Seoul (KR); Chang-Hoi Koo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 724 days.

(21) Appl. No.: 09/606,558

(22) Filed: Jun. 29, 2000

(30) Foreign Application Priority Data

Jun. 29, 1999 (KR) ........................................ 1999-25511

(51) Int. Cl.⁷ ............................................. H04L 12/28
(52) U.S. Cl. ...................... 370/394; 370/335; 370/473; 714/748
(58) Field of Search ................................ 370/335, 338, 370/342, 394, 428, 473; 714/746, 748, 749

(56) References Cited

U.S. PATENT DOCUMENTS

| | | | | |
|---|---|---|---|---|
| 6,169,732 B1 | * | 1/2001 | Hetherington et al. | 370/335 |
| 6,189,122 B1 | * | 2/2001 | Cheng | 714/748 |
| 6,408,003 B1 | * | 6/2002 | Rezaiifar et al. | 370/394 |
| 6,507,582 B1 | * | 1/2003 | Abrol | 370/394 |
| 6,556,556 B1 | * | 4/2003 | Sen et al. | 370/342 |

FOREIGN PATENT DOCUMENTS

| | | |
|---|---|---|
| KR | 10-1998 086756 | 12/1998 |
| WO | WO 98/58469 | 12/1998 |
| WO | WO 99/17489 | 4/1999 |

OTHER PUBLICATIONS

European Search Report dated Mar. 8, 2004 issued in a counterpart application, namely, Appln. No. 00940991.3.
International Search Report, PCT/KR00/00688, Nov. 13, 2000.

* cited by examiner

*Primary Examiner*—Chau Nguyen
*Assistant Examiner*—Christine Ng
(74) *Attorney, Agent, or Firm*—Dilworth & Barrese, LLP

(57) ABSTRACT

Disclosed are an apparatus and a method for retransmitting a failing RLP frame assigned with a new unique identifier agreed to between the transmitting and receiving RLP processors instead of the original sequence number. The receiving RLP processor requests the transmitting RLP processor to retransmit a failing RLP frame assigned with a new identifier determined by the receiving RLP processor. Responding to the request, the transmitting RLP processor retransmits the failing RLP frame assigned with the requested new identifier instead of the original sequence number.

7 Claims, 7 Drawing Sheets

SUPPLEMENTAL DATA FRAME (a)

TYPE='000'

SUPPLEMENTAL DATA FRAME (b)

TYPE='1'

APPARATUS AND METHOD FOR TRANSMITTING AND RECEIVING DATA ACCORDING TO RADIO LINK PROTOCOL IN A MOBILE COMMUNICATIONS SYSTEMS

BACKGROUND OF THE INVENTION

1. Field of the Invention

The present invention relates generally to a code division multiple access (hereinafter referred to as "CDMA") mobile communications system, and more particularly to an apparatus and method for transmitting and receiving data according to the radio link protocol (RLP) in a CDMA mobile communications system.

2. Description of the Related Art

The current IS-95 standard provides for wireless voice communication while the new CDMA 2000 standard provides or high-speed data communication including voice communication. The CDMA2000 standard enables the CDMA mobile communications system to provide services such as high-quality voice and moving picture communication as well as Internet access.

FIG. 1 describes the packet data services provided by the CDMA 2000 standard. A mobile station (MS) comprises terminal equipment (TE), and a mobile termination (MT). The base station (BS) is shown together with the mobile switching center (MSC) indicated by BS/MSC. Also shown is the interworking function part (IWF) for connecting the BS/MSC with a data network such as the Internet. The IWF serves to adapt different protocols employed by two communication parties. Web service parts of both MS and IWF exchange data with each other through Internet protocol (IP) processors and point-to-point link protocol (PPP) processors. Namely, the data produced by the web service parts are converted into link protocol packets and delivered to the lower layers for transmission according to a proper protocol. The web service parts may also be referred to as upper service parts.

As shown in FIG. 1, the link protocol packets transferred through the EIA-232 controller to the MT are delivered through the RLP part and are divided into an RLP frame. The RLP frame thus produced is transmitted through the physical channel connected according to the CDMA 2000 specification (IS-2000). The RLP packets are recovered by the BS into the link protocol packets transmitted through the relay layers to the IWF. Generally, the interface between BS and IWF meets the IS-658 specification. In the IWF, data is extracted from the link protocol packet and transferred through the IP processor to the web service part.

Though the above description shows the process of transmitting data from MS to BS, a similar process applies to the process of transmitting data from BS to MS. The system as shown in FIG. 1 may be modified to provide for a variety of communication services according to the CDMA 2000 standard, but it is common to transmit all the link protocol packets containing the web service data through the RLP part over the radio physical channel.

FIG. 2 is a block diagram illustrating the structure of an apparatus for transmitting and receiving data according to RLP in a mobile communications system. FIG. 2 shows, as a single frame, the structure for establishing a physical channel between MS and BS by the physical layer processor 150, 250 in order to transmit the RLP frames from the RLP processor 130 through the opposite physical layer to the opposite RLP processor 230.

The multiplexing/demultiplexing controller (hereinafter referred to as "MUX/DEMUX controller") 140, 240 attaches the information of the destinations, sizes, etc. to the respective RLP frames transferred to the physical layer processor 150, 250, and analyzes the information attached to the received RLP frames transferred to the upper RLP processor 130, 230.

The transmission and reception data buffers 122, 124, 222, and 224 are memory devices for storing data transferred from the link protocol processors 110 and 210 to the EIA-232 or IS-658 controller, as shown in FIG. 1. The transmission data buffers 122 and 222 sequentially transfer the stored packets to the RLP processors according to the size demanded by them. On the contrary, the reception data buffers 124 and 224 sequentially store the data received from the RLP processors 130 and 230, delivered by the EIA-232 or IS-658 controller to the PPP processor or IWF processor. The EIA-232 and IS-658 controllers control the data exchanged between the data buffers 122, 124, 222, 224 and the link protocol processors 110, 210. FIG. 2 does not show the EIA-232 and IS-658 controllers because they may be replaced by other suitable means in the present CDMA 2000 packet services.

Meanwhile, according to RLP Type-3, the RLP processor 130, 230, as shown in FIG. 2, only produces the RLP frame of a size to fill the physical channel frame of 9.6 Kbps or 19.2 Kbps for rate set 1 (i.e., a transmission rate corresponding to a multiple of 9.6 Kbps), or 14.4 Kbps or 28.8 Kbps for rate set 2 (i.e., a transmission rate corresponding to a multiple of 14.4 Kbps). Hence, for the physical channel frame of a high transmission rate of 153.6 Kbps or 230.4 Kbps, a method is used to fill a single physical channel frame with a plurality of RLP frames, e.g., to transmit at maximum 9 RLP frames per 20 ms. Thus, if 9 RLP frames per 20 ms are transmitted in the RLP Type-3 specification, there occur RLP frames with the same respective sequence numbers as previous ones after 560 ms because the maximum number of the RLP frames distinguished by the 8-bit sequence number field is 256. This means that retransmission of a failing frame should be accomplished before the RLP frames with the same sequence numbers occur. Namely, different frames cannot be distinguished when they contain the same sequence numbers, therefore, it is impossible to request a failing frame with the same sequence number as the previous one. Thus, a failing frame should be retransmitted before another frame occurs with the same sequence number.

However, since the wired transmission protocol, such as TCP/IP, is designed to work in a reliable channel environment, the data packets produced by the wired transmission protocol may require several retransmissions for a complete transmission in a wireless transmission environment. Hence, if there is provided a method for assigning a unique sequence number to an RLP frame for one second or more, instead of 560 ms, retransmission of an RLP frame containing errors may be accomplished regardless of the number of times requesting the retransmission. Thus, considerable improvement of the performance and accuracy of the wired transmission protocol is achieved.

SUMMARY OF THE INVENTION

It is an object of the present invention to provide a method and apparatus for transmitting and receiving data according to RLP without an RLP frame failing due to errors in the physical channel.

It is another object of the present invention to provide an apparatus and method for distinguishing a retransmitted, failing RLP frame by using a unique identifier that is agreed to and known between the transmitting and receiving RLP processors.

It is still another object of the present invention to provide an apparatus and method for preventing the same identifying number as a previous one from being assigned to a retransmitted failing RLP frame by controlling the retransmission request at the receiving RLP processor.

It is still another object of the present invention to provide an apparatus and method for distinguishing a retransmitted failing RLP frame that is retransmitted several times using a small sequence number space.

It is a further another object of the present invention to provide an apparatus for improving packet data services that are liable to errors by increasing the number of times a failing RLP data frame is retransmitted.

According to the present invention, there are provided an apparatus and a method for retransmitting a failing RLP frame assigned with a new unique identifier that is agreed to between the transmitting and receiving RLP processors instead of the original sequence number. The receiving RLP processor requests the transmitting RLP processor to retransmit a failing RLP frame assigned with a new identifier determined by the receiving RLP processor. Responding to the request, the transmitting RLP processor retransmits the failing RLP frame assigned with the requested new identifier instead of the original sequence number.

The present invention will now be described more specifically by way of example with reference to the attached drawings.

BRIEF DESCRIPTION OF THE ATTACHED DRAWINGS

DETAILED DESCRIPTION OF THE PREFERRED EMBODIMENT

Figure 1:
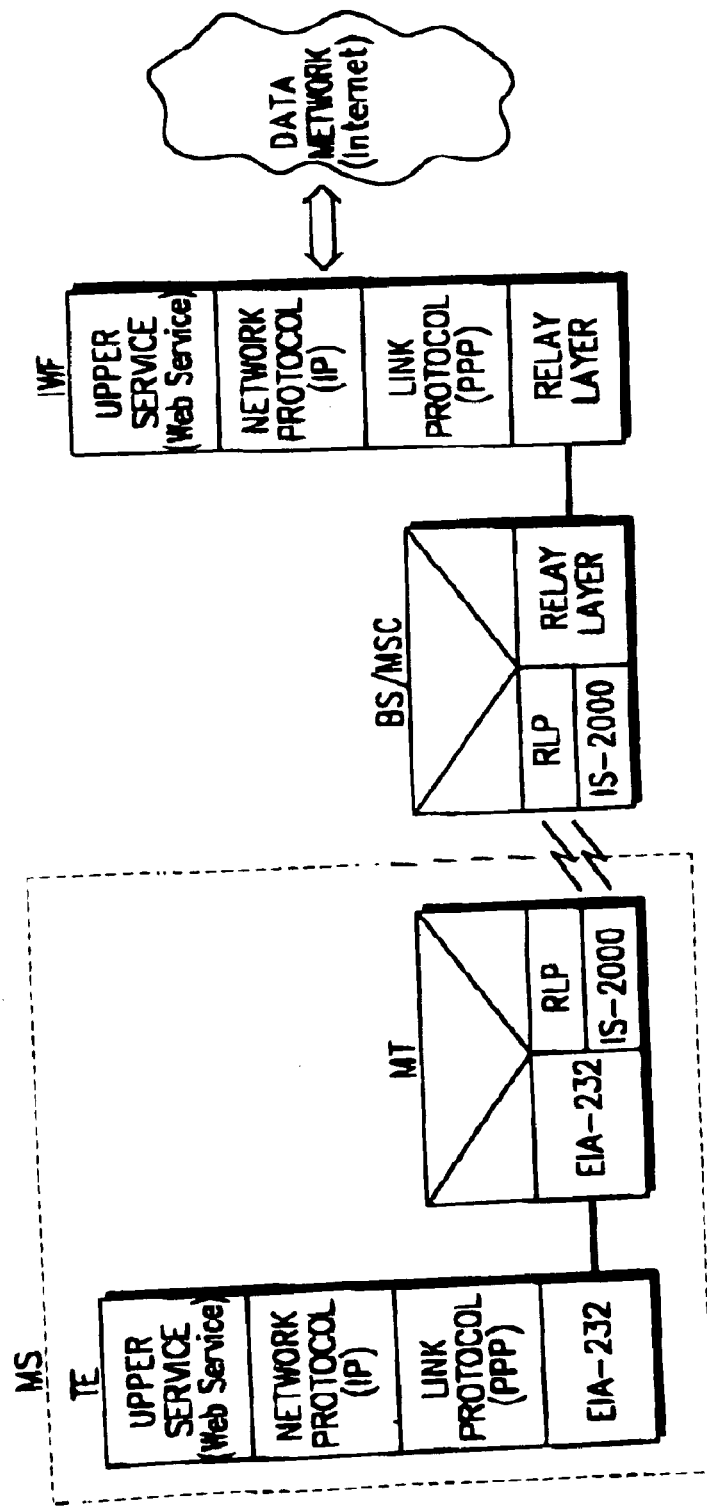
FIG. 1 is a schematic diagram illustrating the structure of a conventional CDMA communications system for providing packet data services.

Throughout the descriptions of the drawings, similar reference numerals denote similar functional parts.

Figure 3:
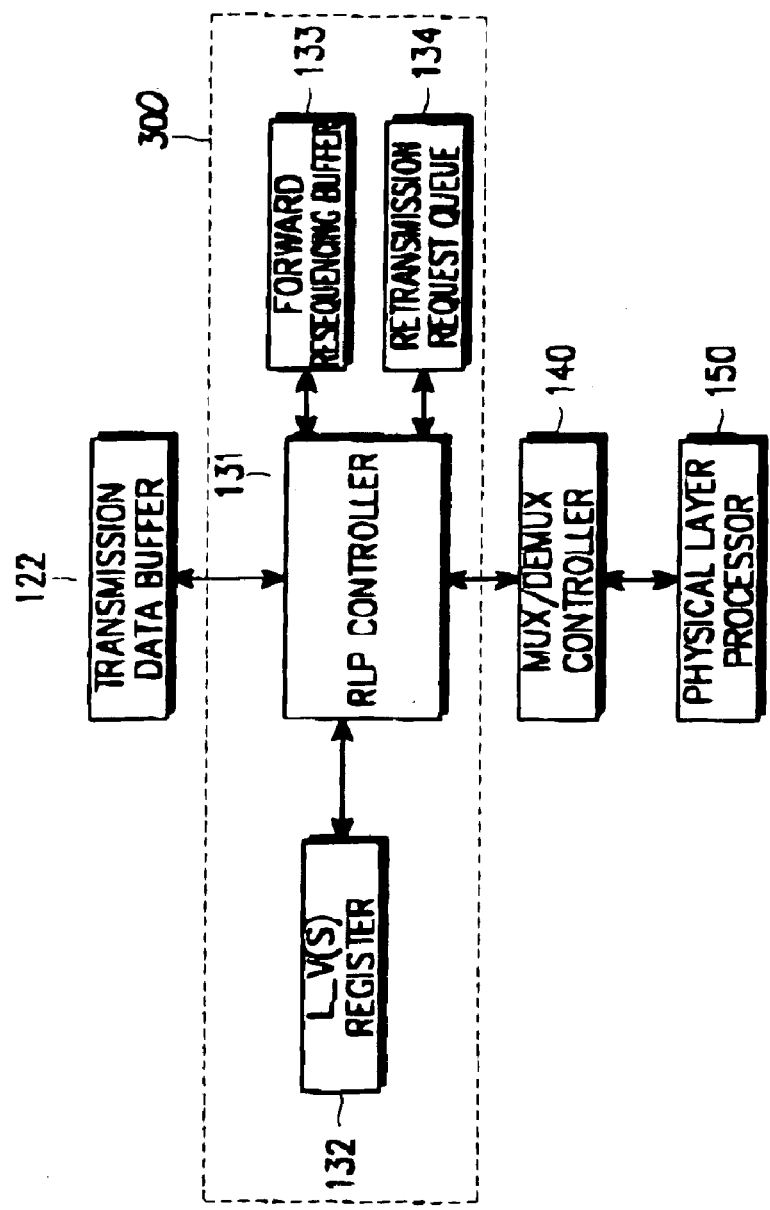
FIG. 3 is a block diagram illustrating the structure of an RLP data transmitter according to the present invention.

Referring to FIG. 3, a transmitting RLP processor 300 is comprised of an RLP controller 131, an L_V(S) register 132, a forward resequencing buffer 133, and a retransmission request queue 134. RLP controller 131 receives a data train from transmission data buffer 122 in order to generate an RLP frame with a size as requested by MUX/DEMUX controller 140. The L_V(S) register 132 serves as a sequence number counter to count the RLP frame transmitted under the control of the RLP controller 131. A sequence number is assigned to each RLP frame and is called a frame sequence number, and a data sequence number is assigned to each data byte of the RLP frame. The RLP controller 131 reads the value of the L_V(S) register 132 as the frame sequence number of a newly generated RLP frame. After transmitting it, the RLP controller 131 increases the value of the L_V(S) register 132 by one for the frame sequence number of the subsequent RLP frame.

The forward resequencing buffer 133 stores the retransmission entry consisting of the frame sequence number, transmitted data, and size of the RLP frame generated by the RLP controller 131. The retransmission request queue 134 stores the retransmission request information received from the receiving RLP processor. Namely, the retransmission request queue 134 stores the retransmission request entry received from the receiving RLP processor. Namely, the retransmission request entry may consist of the sequence number of the retransmitted frame, the identifier determined by the receiving RLP processor, the data sequence number of the first data byte of the retransmitted data, and the size of the retransmitted data. The frame sequence number of the retransmitted frame is that of the failing frame previously transmitted. Namely, the retransmitted frame is the frame that failed in the previous transmission. The identifier is used for the retransmitted frame instead of the frame sequence number.

According to the retransmission request entry stored in the retransmission request queue 134, the RLP controller 131 retrieves the whole or part of the requested frame from the forward resequencing buffer 133 to generate the RLP frame delivered to the MUX/DEMUX controller 140.

Figure 4:
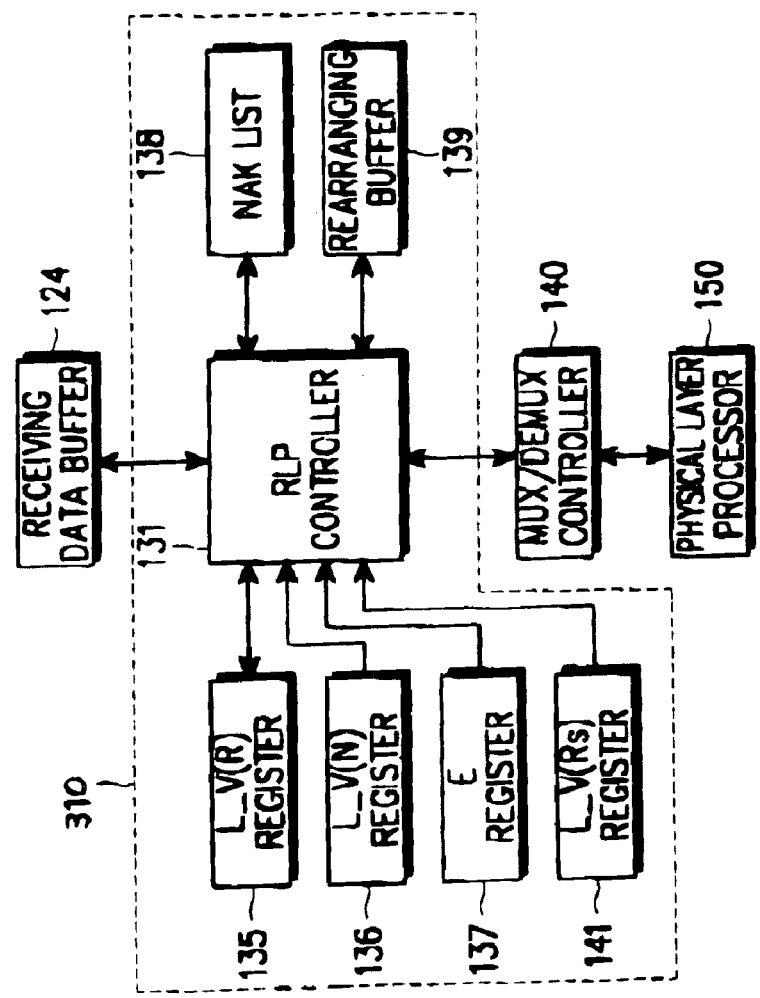
FIG. 4 is a block diagram illustrating the structure of an RLP data receiver according to the present invention.

Referring to FIG. 4, a receiving RLP processor 310 comprises an RLP controller 131, an L_V(R) register 135, an L_V(N) register 136, an E register 137, an NAK list register 138, a rearranging buffer 139, and an L_V(Rs) register 141.

The RLP controller 131 determines whether the received RLP from the MUX/DEMUX controller 140 contains new data or retransmitted data. If new data is detected, the RLP controller 131 stores the received RLP frame into the receiving data buffer 124 provided there is presently no lost or failing frame. However, if there is a lost frame, the RLP controller 131 requests the transmitting RLP processor to retransmit the lost frame, and stores the received RLP frame into the rearranging buffer 139. Alternatively, if the received RLP frame contains the retransmitted data, the RLP controller 131 determines whether the received RLP completes the sequence of all the received frames. If so, it stores them into the receiving data buffer 124.

The L_V(R) register 135 serves as a frame sequence counter to count the frame sequence number of the incoming frame under the control of the RLP controller 131. The L_V(N) register 136 stores the frame sequence number of the first failing RLP frame. The E register 137 stores the number of disrupted RLP frames. The L_V(Rs) register 141 stores the identifier used for the frame sequence number of the retransmitted frame.

The NAK (Non Acknowledge) list 138 stores the NAK entry composed of the frame sequence number of a failing frame, an indicator indicating that a frame is completely received, a list notifying the received data part, a retransmit timer, a round counter, and an identifier. The frame sequence number of a failing frame is that of the retransmitted frame. The list is to notify the data segments received when a frame is segmented into a plurality of data segments transmitted.

The indicator notifies whether all the data of a frame has been completely received through retransmission. The retransmit timer is used for requesting again the retransmission. The round counter decreases its value periodically at a given time after the receiving RLP processor has requested the receiving RLP processor to retransmit, so that, if the value becomes "0" without receiving the retransmitted frame, the receiving RLP processor gives up the retransmission.

The rearranging buffer 139 stores the rearranging buffer entry composed of the frame sequence number of the received data frame, received data, and its size, in order to rearrange incomplete data stored upon receiving the missing data. Namely, the rearranging buffer 139 stores incomplete data to rearrange them together with the missing data received, transferred to the receiving data buffer 124, under the control of the RLP controller 131.

Because the L_V(R) register 135 stores the frame sequence number of the incoming frame, the RLP controller 131 compares the frame sequence number of the received frame with that stored in the register. If the two numbers are equal, and the rearranging buffer 139 has no data awaited for rearranging, the RLP controller transfers the data of the received RLP frame to the receiving data buffer 124, considering that there is no intervening missing frame. Or otherwise, the RLP controller 131 stores the data of the received RLP frame into the rearranging buffer 139, and registers the information of the data part requested for retransmission in the NAK list 138, put into the next control frame transmitted. The MUX/DEMUX controller 140 notifies a disrupted RLP frame to the RLP controller 131 to record it into the E register 137 for resetting.

Figure 2:
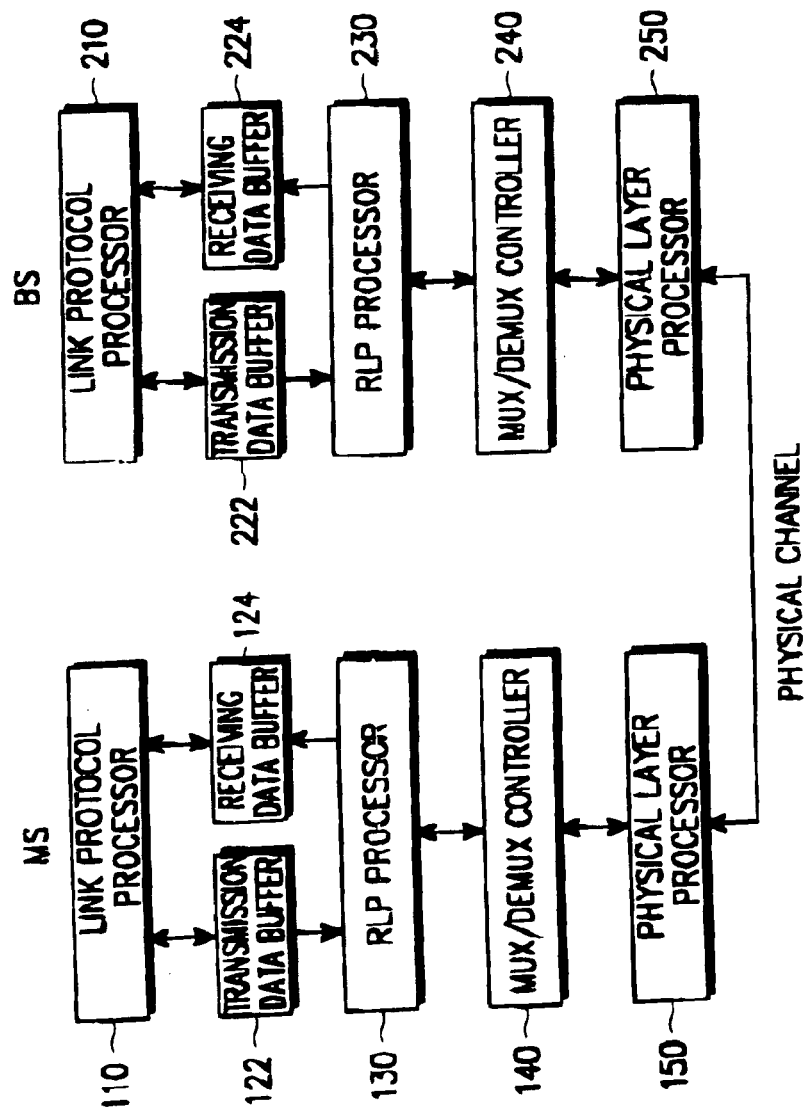
FIG. 2 is a block diagram illustrating an apparatus for transmitting and receiving data according to RLP, for which the invention is applied.

The process of producing, transmitting, and receiving the RLP frame may be described in connection with the two RLP processors 130 and 230, as shown in FIG. 2. However, since both RLP processors 130 and 230 work basically in the same way, in the following description is described the invention only in connection with one RLP processor. An RLP processor according to the present invention contains an RLP data transmitting processor 300 and an RLP data receiving processor 310, as shown in FIGS. 3 and 4 respectively, and includes the RLP controller 131. The operation of RLP processor 300 and 310 is analytically described as follows:

A. Transmission Operation (Hereinafter Referred to as "Tx Operation) of the RLP Controller The RLP controller 131 retrieves data stream from the transmission data buffer 122 to produce the RLP frame with a size requested by the MUX/DEMUX controller 140. It is considered that the data stream stored in the transmission data buffer 122 has unlimited size, and therefore, the RLP controller 131 does not distinguish the beginning and ending parts of the data stream. The amount of the data stream retrieved by the RLP controller 131 from the transmission data buffer 122 depends on the size of the RLP frame requested by the MUX/DEMUX controller 140, so that the data size of the RLP frame varies with the size requested by the MUX/DEMUX controller 140.

If the RLP frame has the number $N_{DATA}$ of data bytes, the RLP controller 131 sequentially and respectively assigns the number of 0 to $N_{DATA}-1$ to the $N_{DATA}$ data bytes. In the present description, the number assigned to each of the $N_{DATA}$ bytes is referred to as "data sequence number". Thus, the RLP controller 131 assigns the data sequence number 0 to the first data byte, 1 to the second data byte, and so on.

In addition, the RLP controller 131 also assigns a sequential number to each RLP frame. This sequential number is referred to as a "frame sequence number". The RLP controller 131 assigns the frame sequence number 0 to the initially produced RLP frame, 1 to the second RLP frame, and so on. Thus, if the previous frame is assigned with the frame sequence number $2^N-1$, the RLP controller 131 assigns again 0 to the coming frame.

The frame sequence number and data sequence number are used to designate a particular data byte in the data stream, which is called two-dimensional addressing. This two-dimensional addressing is necessary to retransmit a part of the data of a frame.

The RLP controller 131 stores the retransmission entry consisting of the frame sequence number, and the transmitted data and its size of each produced frame into the forward resequencing buffer 133. The forward resequencing buffer 133 stores the retransmission entry for a predetermined time. When the receiving RLP processor requests retransmission of a particular frame wholly or partially (a particular data byte of the frame), the RLP controller 131 retrieves the retransmitted data from the retransmission entry of the forward resequencing buffer 133 by the frame sequence number requested by the receiving RLP processor to produce the retransmitted RLP frame. The RLP controller 131 assigns the identifier to the retransmitted RLP frame instead of the frame sequence number used for the initial transmission. Namely, the identifier is received from the receiving RLP processor when requesting the retransmission.

If the data size that the RLP frame demanded by the MUX/DEMUX controller 140 is not enough to contain all the data of the retransmitted frame, the RLP controller 131 segments it into a plurality of data segments. Since each data segment has the data sequence numbers indicating its first and last data bytes together with the identifier, the transmitting RLP processor may transmit the data requested by the receiving RLP processor by using the data segments that may be reassembled into the original frame.

B. Receiving Operation (Hereinafter Referred to as "Rx Operation) of the RLP Controller The RLP controller 131 determines whether each RLP frame received through the MUX/DEMUX controller 140 contains new data or retransmitted data by the retransmission indicator attached to the RLP frame. If the retransmission indicator is "0", the received RLP frame contains new data, and the RLP controller 131 checks the frame sequence number of the received RLP frame. If it agrees with the frame sequence number of the RLP frame having been awaited, there is no intervening missing frame, and the RLP controller 131 stores the received data into the receiving data buffer 124. However, if not agreeing, the RLP controller 131 requests the transmitting RLP controller to retransmit the missing frames, and stores the received frame into the rearranging buffer 139.

The RLP controller 131 may detect the missing frame by comparing the frame sequence number of the received new frame with that of the incoming frame. The RLP controller 131 stores the frame sequence numbers from that of the incoming frame immediately before that of the received new frame into the NAK list 138 as the NAK entry.

The NAK entry consists of the frame sequence number of the missing frame, a list notifying the received data part, an indicator notifying the complete reception of the frame, a retransmit timer, a round counter, and an identifier. In this case, the frame sequence number of the missing frame represents that of the retransmitted frame, and the list notifying the received data part stores the information notifying which data segments have been received when the frame is segmented into a plurality of data segments for transmission. The indicator notifying the complete reception of the frame notifies whether all the data of the frame has been completely received through the retransmission. The retransmission timer and round counter are used for repeating the retransmission request or giving up the retransmission. The identifier is the number identifying the retransmitted frame attached by the transmitting RLP controller instead of the frame sequence number.

The receiving RLP controller 131 assigns the identifier 0 to the initially requested retransmitted RLP frame, requesting the transmitting RLP controller to use the same identifier for the retransmission. If there occurs another missing RLP frame requiring retransmission, the receiving RLP controller 131 assigns to it the identifier obtained by increasing the identifier of the previous retransmitted frame by one. In this case, if the identifier of the previous retransmitted frame is assigned with $2^R-1$, the RLP controller 131 assigns again 0 to the next retransmitted RLP frame.

The receiving RLP controller 131 transfers the frame sequence number of the missing frame together with the identifier to the transmitting RLP controller. Then, the transmitting RLP controller retrieves the missing frame according to the received frame sequence number to retransmit it attached with the received identifier. Thus, if the retransmission indicator of the received RLP frame is "1", the receiving RLP controller 131 considers it the retransmitted frame, obtaining its identifier. Then, if the receiving RLP controller 131 finds the NAK entry having the same identifier from the NAK list 138, the NAK entry provides the corresponding frame sequence number.

Figure 5:
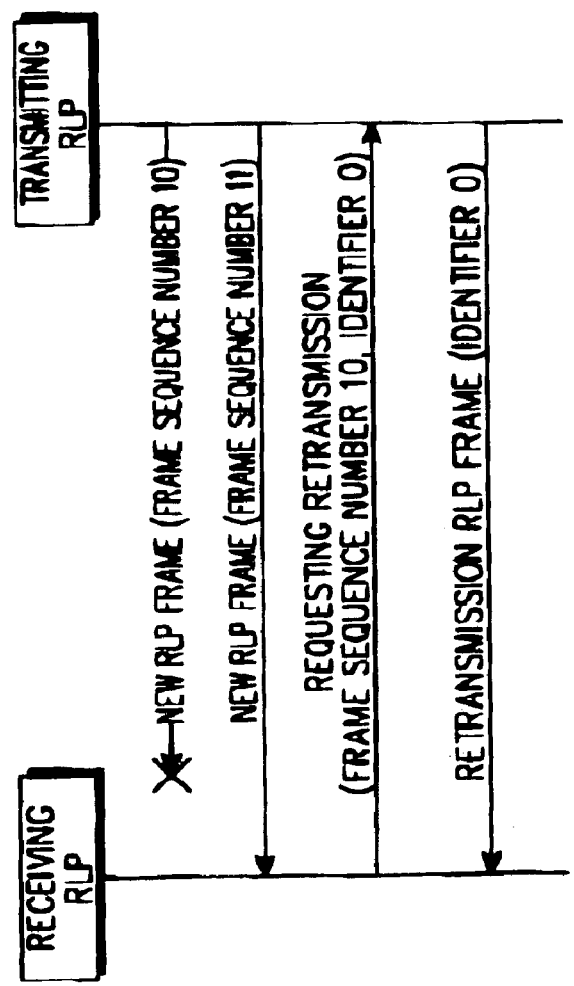
FIG. 5 is a schematic diagram illustrating the relationship between the frame sequence number and the identifier.

For example, referring to FIG. 5, it is assumed that, if the transmitting RLP controller transmits two RLP frames respectively having the frame sequence numbers 10 and 11, and the first frame is missing, then the receiving RLP controller requests the transmitting RLP controller to retransmit the frame numbered 10 by using the identifier 0. Then, the transmitting RLP controller retransmits it assigned with the identifier 0 instead of the frame sequence number 10. The receiving RLP controller may distinguish a new transmission frame and the retransmitted frame by the retransmission indicator contained in the RLP frame. Thus, the receiving RLP controller may match the retransmitted frame with the correct frame sequence number stored in the NAK list 138 by detecting the identifier 0.

C. Operation of the RLP Controller Before Tx

Before transmitting data, the RLP controller 131 sets the L_V(S) register 132, L_V(R) register 135, L_V(N) register 136, E register 137, and L_V(RS) register 141, as shown in FIGS. 3 and 4, to "0". In addition, it deletes all the entries of the forward resequencing buffer 133, retransmission request queue 134, NAK list 138, and rearranging buffer 139. In this embodiment, it is assumed that the L_V(S) register 132, L_V(R) register 135, and L_V(N) register 136 all may store 12-bit integer, and the L_V(RS) register 141 8-bit integer.

The RLP controller 131 employs a 12-bit frame sequence number to transmit data. It determines the frame sequence number in the L_V(S) register 132. In this case, the frame sequence numbers from (N+1) modulo $2^{12}$ to $(N+2^{11}-1)$ modulo $2^{12}$ are considered greater than the frame sequence number N, and those from $(N-2^{11})$ modulo $2^{12}$ to (N-1) modulo $2^{12}$ less than N.

The RLP controller 131 employs 10-bit data sequence number to transmit data. In this case, the data sequence numbers from (N+1) to $(2^{10}-1)$ is considered greater than the data sequence number N, and those from 0 to (N-1) less than N.

Figure 6:
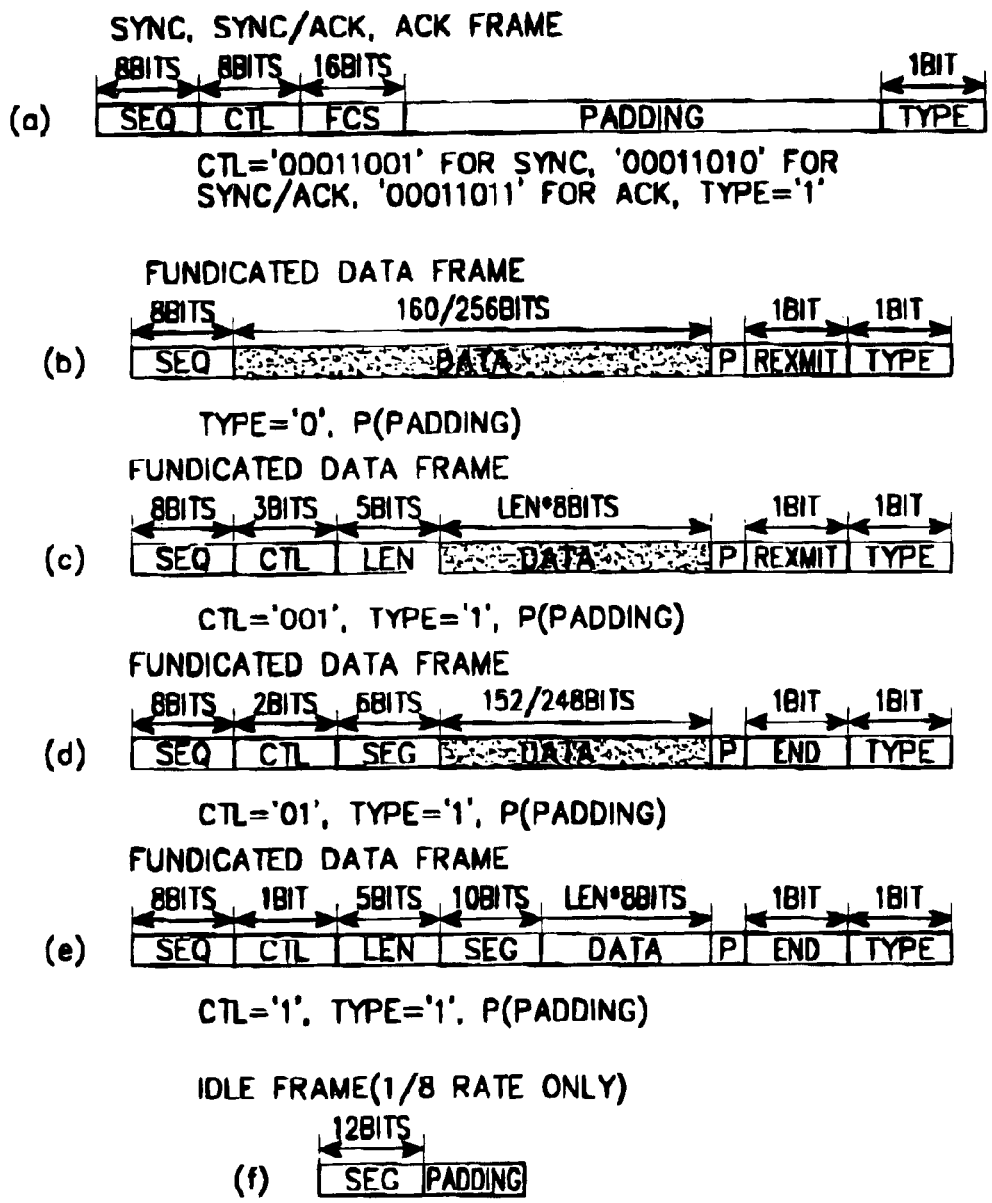
FIGS. 6A to 6F are schematic diagrams illustrating the format of the RLP frame transmitted over the fundamental channel according to the invention.
Figure 7:
FIG. 7 is a schematic diagram illustrating the format of the RLP frame transmitted over the supplemental channel according to the invention.
Figure 7:
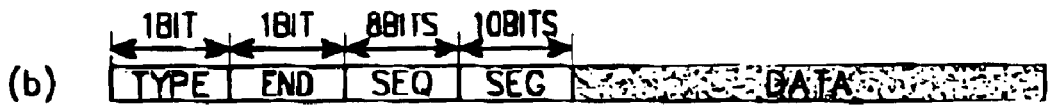

The kinds of RLP frames transferred by the RLP controller 131 to the MUX/DEMUX controller 140 are as shown in FIGS. 6 and 7.

FIG. 6 shows the RLP frames transmitted over the fundamental channel (hereinafter referred to as "FCH"), and FIG. 7 those over the supplemental channel (hereinafter referred to as "SCH"). In this case, SYNC, SYNC/ACK, ACK frames, as shown in FIG. 6, or NAK frame of Table 1 is called "control frame", and the frame for transmitting data "data frame". The data frame includes "new data frame" transmitting new data, and "retransmitted data frame" retransmitting missing data. In FIG. 6, the frame containing only 12-bit SEG field is called "idle frame", treated separately from the control and data frames.

In FIG. 6, the RLP frames transmitted over FCH may be control frame, data frame, or idle frame. FIG. 6A shows the format of SYNC, SYNC/ACK, ACK, and NAK frames, FIGS. 6B to 6E the format of new data frame or fundicated data frame, and FIG. 6F the format of idle frame.

Referring to FIG. 6A, the control frame consists of an 8-bit SEQ field, an 8-bit CTL field, a 16-bit FCS field, a PADDING field, and a 1-bit TYPE field. In this case, CTL field is filled with "00011001" for SYNC, "00011010" for SYNC/ACK, or "00011011" for ACK. The TYPE filed is filled with "1". Referring to FIG. 6B, the data frame consists of an 8-bit SEQ field, a 160/256-bit DATA field, a PADDING field, a 1-bit REXMIT field, and a 1-bit TYPE field. In this case, the TYPE field is filled with "0". Referring to FIG. 6C, the data frame consists of an 8-bit SEQ field, a 3-bit CTL field, a 5-bit LEN field, a LEN×8 bit DATA field, a PADDING field, a 1-bit REXMIT field, and a TYPE field. In this case, the CTL field is filled with "001", and TYPE field with "1". Referring to FIG. 6D, the data frame consists of an 8-bit SEQ field, a 2-bit CTL field, a 6-bit SEG field, a 152/248-bit DATA field, a PADDING field, a 1-bit END field, and a TYPE field. In this case, the CTL field is filled with "01", and TYPE field with "1". Referring to FIG. 6E, the data frame consists of an 8-bit SEQ field, a 1-bit CTL field, a 5-bit LEN field, a 10-bit SEG field, a LEN×8-bit DATA field, a PADDING field, a 1-bit END field, and a TYPE field. In this case, the CTL field is filled with "1", and TYPE field with "1". Referring to FIG. 6F, the idle frame consists of a 12-bit SEG field, and a PADDING field. Every frame and every field shown in these drawings are described in more detail in the following description.

Referring to FIG. 7, the RLP frame transmitted over SCH may be the data frame. Referring to FIG. 7A, the data frame consists of a 3-bit TYPE field, a 1-bit REXMIT field, an 8-bit SEQ field, and a DATA field. In this case, the TYPE field is filled with "000". Referring to FIG. 7B, the data frame consists of a 1-bit TYPE field, a 1-bit END field, an 8-bit SEQ field, a 10-bit SEG field, and a DATA field. In this case, the TYPE field is filled with "1". Every frame and every field shown in these drawings are described in more detail in the following description.

Before transmitting data, the RLP controller 131 carries out the resetting process as follows:

First, the RLP controller 131 repeatedly transfers SYNC frame to the MUX/DEMUX controller 140.

Second, if the RLP controller 131 receives the SYNC frame from the MUX/DEMUX controller 140, it repeatedly transfers SYNC/ACK frame to the MUX/DEMUX controller 140 until receiving any one of the frames as shown in FIGS. 6 and 7 except for SYNC frame.

Third, if the RLP controller 131 receives SYNC/ACK frame, it repeatedly transfers ACK frame to the MUX/

DEMUX controller 140 until receiving any one of the frames as shown in FIGS. 6 and 7 except for SYNC/ACK frame. The RLP controller 131 begins to perform data transmission if receiving any one of the frames as shown in FIGS. 6 and 7 except for SYNC/ACK frame. Thus, after completing the resetting process, the RLP controller 131 may transfer all kinds of the frames as shown in FIGS. 6 and 7 except for SYNC, SYNC/ACK, and ACK frames to the MUX/DEMUX controller 140.

D. Tx/Rx Operation Over FCH/SCH According to an Embodiment of the Invention (D-1). Tx Operation of RLP Controller Over FCH The MUX/DEMUX controller 140 requests the RLP controller 131 to produce an RLP frame over FCH. In this case, the MUX/DEMUX controller 140 notifies the RLP controller 131 of the size "T" of the RLP frame produced. In the present invention, the size "T" is assumed to be 171 bits for Rate Set 1, and 266 bits for Rate Set 2. The RLP controller 131 produces the RLP frame transmitted over FCH in the following priority:

First, control frame (SYNC, SYNC/ACK, ACK, NAK frame)

Second, retransmitted data frame

Third, new data frame

Fourth, idle frame.

1. Tx Operation of Control Frame

The RLP controller 131 produces SYNC, SYNC/ACK, and ACK frames by filling SEQ field with "00000000", setting CTL field according to the kind of frame, and attaching FCS field. The FCS field is a 16-bit frame check sequence prepared by a polynomial specified in RFC-1662. The FCS field is prepared for all the preceding bits. The RLP controller 131 sets the field subsequent to the FCS field all to "0" according to the size notified by the MUX/DEMUX controller 140. It also sets the last 1-bit TYPE field of the produced RLP frame to "1", transferred to the MUX/DEMUX controller 140. If there is data to be transmitted the RLP controller 131 produces NAK frame transferred to the MUX/DEMUX controller 140. The NAK frame has a structure as shown in Table 1.

TABLE 1

| Field | Length |
|---|---|
| SEQ | 8 bits |
| CTL | 8 bits |
| L_SEQ_HI | 4 bits |
| NAK_FRM_COUNT | 3 bits |
| NAK_SEG_COUNT | 3 bits |
| Filled with the following fields by NAK_FRM_COUNT+1 | |
| RETX_IDENTIFIER | 8 bits |
| FIRST | 12 bits |
| LAST | 12 bits |
| Filled with the following fields by NAK_SEG_COUNT+1 | |
| RETX_IDENTIFIER | 8 bits |
| NAK_SEG | 12 bits |
| FIRST_SEG | 10 bits |
| LAST_SEG | 10 bits |
| Filled with the following fields subsequent to the above fields | |
| PADDING_1 | Variable length |
| FCS | 16 bits |
| PADDING_2 | Variable length |
| TYPE | 1 bit |

According to Table 1, the RLP controller 131 prepares NAK frame by setting L_SEQ_HI field to the upper 4 bits of the L_V(N) register 136, SEQ field to the lower 8 bits thereof, CTL field to "11110100", and TYPE field to "1".

The prepared NAK frame is transmitted to a transmitter and then, retransmission for failing frames is requested. The RLP controller of a transmitter confirms the value of L_V(N) register 136 contained in the NAK frame, i.e., values of L_SEQ_HI field and SEQ field. And, data of a frame sequence number having less value than that of L_V(N) register 136 among data stored in the retransmission buffer 133, are thrown away. Accordingly, the size of the retransmission buffer 133 can be reduced.

The RLP controller 131 takes the value obtained by subtracting one from the retransmission request number as the NAK_FRM_COUNT field. In addition, the RLP controller 131 takes as the NAK_SEG_COUNT field the value obtained by subtracting one from the retransmission request number for a part of the frame to be included in the NAK frame.

The RLP controller 131 fills the value obtained by adding one to the value of the NAK_FRM_COUNT field with the retransmission request for the whole frame. The RLP controller 131 fills the FIRST field with the frame sequence number of the first frame repeatedly requested for retransmission, and the LAST field with the frame sequence number of the last frame. The RLP controller 131 fills the RETX_IDENTIFIER with the identifier of the first frame.

The RLP controller 131 fills the value obtained by adding one to the value of the NAK_SEG_COUNT field with the retransmission request for a part of the frame. The RLP controller 131 inserts the frame sequence number of the frame containing the data segment requested for retransmission into the NAK_SEQ field, the data sequence number of the first data byte of the data segment requested for retransmission into the FIRST field, and the data sequence number of the last data byte into the LAST field. When requesting retransmission from the first data byte to the end of the data segment, the RLP controller 131 may fill all the LAST field with 1 instead of the data sequence number of the last data byte. The RLP controller 131 fills the RETX_IDENTIFIER field with the identifier of the frame containing the data segment requested for retransmission.

Inserting the entire retransmission request, the RLP controller 131 pads the FCS field with "0" for byte arrangement to fill the FCS field. The FCS field is 16-bit frame check sequence prepared by polynomial specified in RFC-1662. It is prepared for all the preceding bits. After filling the FCS field, the RLP controller 131 fills the remaining part of the RLP frame with "0". The RLP controller 131 transfers the produced RLP frame to the MUX/DEMUX controller 140.

2. Tx Operation of New Data Frame

The RLP controller 131 produces new data frame transmitted over FCH as follows:

First, the RLP controller 131 attaches 12-bit data sequence number to the new data frame according to the value of the L_V(S) register 132.

Second, the RLP controller 131 produces the new data frame transmitted over FCH by using the format of FIG. 6B or 6C. In this case, it sets the SEQ field to the value is of the lower 8 bits of the 12-bit sequence number, and the retransmission indicator REXMIT field with "0". The completed frame is transferred to the MUX/DEMUX controller 140.

Third, the RLP controller 131 sets the L_V(S) register 132 to the remainder obtained by dividing the 12-bit data sequence number added with one by 212. In this case, the RLP controller 131 increases the value of the L_V(S) register 132 only when having prepared the new data frame. Namely, when retransmitting previous data, control data, or idle frame, the value of the L_V(S) register 132 is not increased.

The RLP controller 131 stores newly defined frames into the forward resequencing buffer 133 in preparation for retransmission request of the receiving side. As described above, the RLP controller 131 prepares the retransmission entry consisting of the frame sequence number, transmitted data and its size stored into the retransmission entry.

3. Tx Operation of Retransmitted Data Frame

The RLP controller 131 retransmits the data segment requested according to the retransmission entry stored in the retransmission request queue 134. The retransmission request entry consists of the frame sequence number of the retransmitted frame, its identifier, data sequence number of the first data byte of the retransmitted data segment, and the size of the data segment.

The RLP controller 131 produces the retransmitted data frame according to the retransmission request entry as follows:

First, the forward resequencing buffer 133 is searched to the retransmission entry having the same frame sequence number as the requested frame sequence number. If no requested entry is found, the RLP controller 131 deletes the retransmission request entry from the retransmission request queue 134.

Second, if the requested entry is found in the previous step, the RLP controller 131 gets the retransmitted data segment from the data stored in the retransmission entry according to the data sequence number and its size of the retransmission request entry. In this case, if the retransmission request is for the entire frame, it gets all data stored in the retransmission entry.

Third, the RLP controller 131 produces the data frame retransmitted over FCH by using one of the formats as shown in FIGS. 6B to 6E. The produced data frame is transferred to the MUX/DEMUX controller 140. Then, the RLP controller 131 deletes the retransmission request entry from the retransmission request queue 134.

Though the formats of FIGS. 6B to 6E may be used for producing the retransmitted data frame, the formats of FIGS. 6B and 6C are used with meeting the following conditions:

First, the retransmission request is for the entire frame.

Second, if the size of the retransmitted data is equal to or less than the number B of the data bytes, i.e., 20 bytes for Rate Set 1, or 32 bytes for Rate Set 2, the RLP controller 131 uses the format of FIG. 6B or 6C.

Retransmitting the frame using the format of FIG. 6B, the RLP controller 131 firstly sets the SEQ field to the identifier stored in the retransmission request entry. In addition, it sets the TYPE field to "0", REXMIT field to "1", and fills the DATA field with the retransmitted data.

Retransmitting the frame using the format of FIG. 6C, the RLP controller 131 firstly sets the SEQ field to the identifier stored in the retransmission request entry. In addition, it sets the TYPE field to "1", the retransmission request indicator REXMIT field to "1", CTL field to "001", and fills the DATA field with the retransmitted data. The LEN field is set to the number of the data bytes filling the DATA field.

If not meeting the condition required by the format of FIG. 6B or 6C, the RLP controller 131 performs the segmentation procedure as follows:

First, the leading segment of the remaining data part of the retransmitted frame is transmitted by using the format of FIG. 6D or 6E.

Second, the previous step is repeated until completing transmission of the remaining data part.

The RLP controller 131 performs the segmentation procedure by using the format of FIG. 6D or 6E. The format of FIG. 6D may be used with meeting the following conditions:

First, the size of the data part of the retransmitted frame is greater than the number B of the data bytes to be transmitted in the format of FIG. 6D, i.e., 19 bytes for Rate Set 1, or 31 bytes for Rate Set 2.

Second, the size of the entire data of the retransmitted frame is equal to or less than the size to be expressed by the SEG field of the format of FIG. 6D, i.e., $2^8$.

Retransmitting the data segment of the frame in the format of FIG. 6D, the RLP controller 131 sets the SEQ field to the identifier stored in the retransmission request entry, SEG field to the data sequence number of the first data byte of the data segment of the frame, TYPE field to "1", CTL field to "01", and fills the DATA field with the retransmitted data. In addition, the RLP controller 131 sets the END field to "1" or "0" according as the data segment retransmitted contains the last data byte of the data of the frame or no.

Retransmitting the data segment of the frame in the format of FIG. 6E, the RLP controller 131 sets the SEQ field to the identifier stored in the retransmission request entry, SEG field to the data sequence number of the first data byte of the data segment of the frame, TYPE field to "1", and CTL field to "01". In addition, it fills the DATA field with the retransmitted data, and sets the LEN field to the number of the data bytes filling the DATA field. Also, the RLP controller 131 sets the END field to "1" or "0" according as the data segment retransmitted contains the last data byte of the data of the frame or no.

4. Tx Operation of Idle Frame

When the MUX/DEMUX controller 140 requests the RLP frame with a size of 16 bits, 20 bits or 32 bits, or there are no new data transmitted, retransmitted data frame, and control frame transmitted, the RLP controller 131 may transmit the idle frame in the format of FIG. 6F. In order to produce the idle frame, the RLP controller 131 fills the SEQ field with the 12-bit value of the L_V(S) register 132. Filling the remaining part of the idle frame with "0", the RLP controller 131 transfers the idle frame to the MUX/DEMUX controller 140.

(D-2). Rx Operation of the RLP Controller Over FCH

The MUX/DEMUX controller 140 notifies the RLP controller 131 of the received RLP frame together with its size T.

1. Rx Operation of Control Frame

Receiving SYNC, SYNC/ACK, and ACK frames of the control frame, the RLP controller 131 performs the resetting procedure.

Receiving the NAK frame, the RLP controller 131 analyzes it according to Table 1. At first, the RLP controller 131 gets the 12-bit frame sequence number consisting of the L_SEQ_HI field value as the upper 4 bits and the SEQ field value as the lower 8 bits contained in the NAK frame. Since the frame sequence number is the value of the receiving L_V(N) register 136, the RLP controller 131 may deletes the retransmission entries with the frame sequence numbers less than the value of the L_V(N) register 136 from the forward resequencing buffer 133. If the value of the receiving L_V(N) register 136 is greater than the value of the L_V(S) register 132, the RLP controller 131 performs the resetting procedure.

The RLP controller 131 determines the number of the frame retransmission requests of the received NAK frame and its partial retransmission requests from the values of the NAK_FRM_COUNT field and NAK_SEG_COUNT field of the NAK frame.

The RLP controller 131 performs the following steps for each of the frame retransmission requests numbering NAK_FRM_COUNT+1 contained in the NAK frame.

First, the frame sequence number FS of the frame requested for retransmission is set as the value of the FIRST field of the frame retransmission request. The identifier RS received from the receiving side is set as the value of the RETX_IDENTIFIER field of the frame retransmission request.

Second, for the frame sequence number FS, the retransmission request entry is prepared consisting of the frame sequence number of the retransmitted frame, its identifier, data sequence number of the first data byte of the retransmitted data part, and data size retransmitted. In the retransmission request entry, the FS is set as the frame sequence number of the retransmitted frame, RS as the identifier for the frame, "0" as the data sequence number of the first data byte of the retransmitted data part because of requesting the entire frame, and the size of the entire data of the frame as the entire data size.

Third, the retransmission request entry is put into the retransmission request queue 134, so that the transmitting RLP controller retransmits the requested data according to the retransmission request entry.

Fourth, if the FS value is equal to the value of the LAST field of the frame retransmission request, the process is ended. If not, the above steps are repeated after setting the remainder after dividing FS+1 by $2^{12}$ as new FS, and the remainder after dividing RS+1 by $2^8$ as new RS.

The RLP controller 131 performs the following steps for each of the retransmission requests of parts of the frame numbering NAK_SEG_COUNT+1 contained in the received NAK frame.

First, the frame sequence number FS of the retransmitted frame is set as the value of the NAK_SEQ field of the partial retransmission request. The identifier RS received from the receiving side is set as the value of the RETX_IDENTIFIER field of the partial retransmission request.

Second, for the frame sequence number FS, the retransmission request entry is prepared consisting of the frame sequence number of the retransmitted frame, its identifier, data sequence number of the first data byte of the retransmitted data part, and data size retransmitted. In the retransmission request entry, the FS is set as the frame sequence number of the retransmitted frame, RS as the identifier for the frame, the value of the FIRST_SEQ field of the partial retransmission request of the frame as the data sequence number of the first data byte of the retransmitted data part, and the remainder after subtracting the FIRST_SEQ field value from the LAST_SEQ field value as the size of the retransmitted data part.

Third, the retransmission request entry is put into the retransmission request queue 134, so that the transmitting RLP controller retransmits the requested data according to the retransmission request entry.

2. Rx Operation of New Data Frame and Retransmitted Data Frame

Receiving new data frame in the format of FIG. 6B or 6C, the RLP controller 131 calculates the 12-bit sequence number L_SEQ of the new data using the 12-bit value of the sequence number register L_V(R) 135 and the value of the SEQ field of the new data frame according to the following Equation 1:

$$L\_SEQ=[L\_V(R)+\{2^8+SEQ-(L\_V(R) \bmod 2^8)\} \bmod 2^8] \bmod 2^{12} \quad \text{Equation 1}$$

Then, the RLP controller 131 processes the retransmitted data frame by using the NAK list 138. Each NAK entry of the NAK list 138, as described above, is composed of the frame sequence number of a missing frame, an indicator notifying complete reception of a frame, a list notifying the received data part, a retransmit timer, a round counter, and an identifier. The RLP controller 131 searches the NAK list 138 to find the NAK entry whose stored identifier agrees with the value contained in the 8-bit SEQ field of the retransmitted frame. Detecting such NAK entry, the frame sequence number stored therein is set as the frame sequence number L_SEQ of the received frame. However, not detecting it, the RLP controller 131 discards the received frame.

The RLP controller 131 distinguishes the new data frame or retransmitted data frame of the format of FIG. 6B or 6C numbered with the 12-bit frame sequence number L_SEQ as described above by means of the L_V(N) register 136 and L_V(R) register 135, as follows:

First, if the frame sequence number L_SEQ is equal to or greater than the value of the L_V(N) register 136, or less than the value of the L_V(R) register 135, the RLP controller 131 considers the received frame as the retransmitted data frame.

Second, if the frame sequence number L_SEQ is equal to or greater than the value of the L_V(R) register 135, or less than the value obtained by operating the combined value of the L_V(R) register 135 and E register 137 modulo $2^{12}$, the RLP controller 131 considers it as new data frame.

Third, if the frame sequence number L_SEQ is equal to or greater than the value obtained by operating the combined value of the L_V(R) register 135 and E register 137 modulo $2^{12}$, the RLP controller 131 considers it as duplicated data frame.

If the received data frame is considered as duplicated, the RLP controller 131 discards it. However, if the received data frame is considered new data frame or retransmitted data frame, the RLP controller 131 performs the following procedure:

First, if the frame sequence number L_SEQ of the received frame is greater than the value of the L_V(N) register 136, and less than the value of the L_V(R) register 135, the RLP controller 131 prepares the rearranging (resequencing) buffer entry of the received data frame stored into the rearranging buffer 139. The rearranging buffer entry consists of the frame sequence number of the received data frame, and its data size. The RLP controller 131 registers the reception of the waited data frame in the indicator notifying complete reception of frame in the NAK entry with the same frame sequence number as the received data frame, stored in the NAK list 138.

Second, if the frame sequence number L_SEQ of the received frame is equal to is the value of the L_V(N) register 136, and less than the value of the L_V(R) register 135, the RLP controller 131 transfers the data part of the received data frame to the receiving data buffer 124. In addition, all the rearranging buffer entries having continuous frame sequence numbers staring from the rearranging buffer entry with a value equal to the remainder after dividing the addition of the value of the L_V(N) register and one divided $2^{12}$ are transferred to the receiving data buffer, and then deleted from the rearranging buffer 139. The RLP controller 131 searches the NAK entry having the same frame sequence number as the received frame to register the reception of the data frame waited in the indicator notifying complete reception of the data frame. The RLP controller 131 sets the value of the L_V(N) register 136 to the remainder after dividing L+1 by $2^{12}$ if L is the frame sequence number of the last rearranging buffer entry among the deleted rearranging buffer entries.

Third, if the frame sequence number L_SEQ of the received frame is equal to the value of the L_V(R) register 135, and the value of the L_V(R) register 135 equal to the value of the L_V(N) register 136, the RLP controller 131 registers the remainder after dividing the addition of the value of the L_V(R) register 135 and one by 212 in the L_V(R) register 135, and the remainder after dividing the addition of the value of the L_V(N) register 136 and one by $2^{12}$ in the L_V(R) register 136. The RLP controller 131 transfers the data part of the received frame to the receiving data buffer 124.

Fourth, if the frame sequence number L_SEQ of the received frame is equal to the value of the L_V(R) register 135, and the value of the L_V(R) register 135 not equal to the value of the L_V(N) register 136, the RLP controller 131 registers the remainder after dividing the addition of the value of the L_V(R) register 135 and one by $2^{12}$ in the L_V(R) register 135. The RLP controller 131 prepares the rearranging (resequencing) buffer entry of the received data frame registered in the rearranging buffer 139 the data part of the received frame to the receiving data buffer 124.

Fifth, if the frame sequence number L_SEQ of the received frame is greater than the value of the L_V(R) register 135, the RLP controller 131 prepares the NAK entry of each frame added to the NAK list 139 in order to request retransmission of all the frames having the continuous frame sequence numbers starting from the value of the L_V(R) register 135 to (L_SEQ−1) modulo $2^{12}$. Each entry has the 12-bit frame sequence number of the corresponding frame. The RLP controller 131 prepares the resequencing buffer entry of each received frame stored in the rearranging buffer 139, and sets the L_V(R) register 135 to (L_SEQ+1) modulo $2^{12}$.

The RLP controller 131 treats the received data frame in the format of 6D or 6E according to the NAK list 138 as shown in FIG. 4. Each NAK entry of the NAK list 138 consists of the frame sequence number of a failing frame, indicator notifying a frame completely received, list notifying the received data part, retransmit timer, round counter, and identifier. The RLP controller 131 searches the NAK list 138 to detect the NAK entry having the same value as the value of the 8-bit SEQ field of the received retransmitted frame. If detecting such NAK entry, the frame sequence number of the NAK entry is set as the frame sequence number L_SEQ of the received frame. Or otherwise, the RLP controller 131 discards the received frame.

Receiving the frame in the format of FIG. 6D or 6E, the RLP controller 131 set the 10-bit data sequence number L of the first byte of the data part of the received frame as the SEG field value. Then, the RLP controller 131 may calculate the data sequence numbers of the remaining data bytes based on the data sequence number L of the first data byte. Namely, the data sequence number of the last data byte is L+B−1 calculated by adding the data sequence number L and the size B of the received data part, and subtracting 1 from the addition. Of course, the other intermediate data bytes may be assigned with respective data sequence numbers obtained by adding one to the previous data sequence number.

Receiving the data frame in the format of FIG. 6D or 6E with the END field set to "1", the RLP controller 131 determines that there has come the last data byte of the retransmitted data part. In addition, the RLP controller 131 may get the information of the data part having been received until now from the list notifying the received data part in the NAK entry of the NAK list 138. Thus, receiving all the data bytes including the first and last data bytes, the retransmitted frame is processed with the completed data part and the frame sequence number L_SEQ, as when receiving the frame in the format of FIG. 6B or 6C.

Alternatively, not receiving all the data bytes, the RLP controller 131 registers the received data in the list notifying the received data part in the NAK entry searched out from the NAK list 138.

3. Rx Operation of the Idle Frame

Receiving the idle frame in the format of FIG. 6F, the RLP controller 131 sets the value of the received 12-bit SEQ field as the frame sequence number L_SEQ.

First, if the frame sequence number L_SEQ of the received idle frame is greater than the value of the L_V(R) register 135, the RLP controller 131 prepares the NAK entry of each frame added to the NAK list 139 in order to request retransmission of all the frames having the continuous frame sequence numbers starting from the value of the L_V(R) register 135 to (L_SEQ−1) modulo 212. Each entry has the 12-bit frame sequence number of the corresponding frame.

Second, the RLP controller 131 performs the reset procedure if the frame sequence number L_SEQ of the received idle frame is less than the value of the L_V(R) register 135. If the MUX/DEMUX controller 140 informs the RLP controller 131 of the reception of a disrupted RLP frame, the RLP controller 131 increases the value of the E register 137. If the increased value of the E register 137 becomes greater 255, the RLP controller 131 performs the reset procedure. Or otherwise, if receiving a correct RLP frame, the RLP controller 131 resets the value of the E register to 0.

(D-3). Tx Operation of the RLP Controller Over SCH

The transmitting MUX/DEMUX controller 140 requests the RLP controller 131 to generate the RLP frame transmitted over SCH. In this case, it informs the RLP controller 131 of the maximum size T of the RLP frame generated by the RLP controller 131. The RLP controller generates the RLP frames according to priorities, i.e., firstly retransmitted data frame, and secondly new data frame.

1. Tx Operation of New Data Frame

The RLP controller 131 works to generate new data frame transmitted over SCH, as follows:

First, the RLP controller 131 assigns the 12-bit sequence number to the new data frame according to the value of the L_V(S) register 132.

Second, the RLP controller 131 generates the new data frame transmitted over SCH according to the format of FIG. 7A. In this case, the RLP controller 131 sets the SEQ field to the lower 8-bit value of the 12-bit sequence number, and REXMIT field to "0". The generated frame is transferred to the MUX/DEMUX controller 140.

Third, after transferring the new data frame, the RLP controller 131 sets the L_V(S) register 132 with the remainder after dividing the addition of the 12-bit sequence number and 1 by $2^{12}$. In this case, the RLP controller 131 increases the value of the sequence number register L_V(S) 132 only when generating a new data frame. Namely, the value of the L_V(S) register 132 is not increased when retransmitting the previous data.

The RLP controller 131 stores the newly defined frames into the forward resequencing buffer 133 in preparation for a retransmission request from the receiving side. Thus, the RLP controller 131 includes the frame sequence number, transmitted data, and its data size in the retransmission entry stored in the forward resequencing buffer.

2. Tx Operation of Retransmitted Data Frame

If the retransmission request queue 134 has the retransmission request entry, the RLP controller 131 should retransmit the data part requested. The retransmission request entry consists of the frame sequence number of the retransmitted frame, identifier identifying the frame, data sequence number of the first data byte of the retransmitted data part, and size of the retransmitted data. The RLP controller 131 works to generate the retransmitted data frame according to the retransmission request entry, as follows:

First, the resequencing buffer 133 is searched to detect having the same frame sequence number as the requested frame sequence number. If there is no such entry, the RLP controller 131 deletes the retransmission request entry from the retransmission request queue 134.

Second, if there is such entry, the RLP controller 131 gets the retransmitted data part from the data stored in the retransmission entry according to the data sequence number and data size in the retransmission request entry. If the entire frame is requested, it gets the entire data stored in the retransmission entry.

Third, the RLP controller 131 generates the retransmitted data frame transmitted over SCH by using the format of FIG. 7A or 7B. After transmitting the generated frame to the MUX/DEMUX controller 140, the RLP controller 131 deletes the retransmission request entry from the retransmission request queue 134. The RLP controller 131 may use the format of FIG. 7A when the following conditions are met:

First, the entire frame is requested for retransmission.

Second, the size of the retransmitted data is equal to or less than the number of the data to be transmitted in the format of FIG. 7A, i.e., the value obtained by subtracting the header size 12 bits of the format of F7A from the size T notified by the MUX/DEMUX controller 140.

The RLP controller 131 sets the SEQ field of the retransmitted frame with the identifier stored in the retransmission entry. In addition, it sets the TYPE field to "000", the retransmission indicator REXMIT field to "1", and fills the DATA field with the retransmitted data.

If the conditions to use the format of FIG. 7A are not met, the RLP controller 131 performs the following segmentation procedure:

First, it transmits the leading part of the retransmitted data part not yet transmitted by using the format of FIG. 7B.

Second, it repeats the first step until completing the transmission of the entire data part of the retransmitted frame.

When segmenting the data part of the retransmitted frame by using the format of FIG. 7B, the RLP controller 131 sets the SEQ field with the identifier stored in the retransmission request entry. It also sets the SEG field with the data sequence number of the first data byte of the data part of the frame. It sets the TYPE field to "1", and fills the DATA field with the retransmitted data. It also sets the END field to "1" or "0" according as the retransmitted data part contains the last data byte of the data of the frame or not.

(D-4). Rx Operation of the RLP Controller Over SCH.

The MUX/DEMUX controller 140 informs the RLP controller of the frame size T of the received RLP frame.

1. Rx Operation of New and Retransmitted Data Frames

The RLP controller 131 calculates the 12-bit sequence number L_SEQ of the received new data frame by using the 12-bit value of the sequence number register L_V(R) 135 and the value of the SEQ field of the received new data frame according to Equation 1.

The RLP controller 131 treats the received data frame in the format of 7A according to the NAK list 138 as shown in FIG. 4. Each NAK entry of the NAK list 138 consists of the frame sequence number of a failing frame, indicator notifying a frame completely received, list notifying the received data part, retransmit timer, round counter, and identifier. The RLP controller 131 searches the NAK list 138 to detect the NAK entry having the same value as the value of the 8-bit SEQ field of the received retransmitted frame. If detecting such NAK entry, the frame sequence number of the NAK entry is set as the frame sequence number L_SEQ of the received frame. Or otherwise, the RLP controller 131 discards the received frame.

After receiving the new or retransmitted data frame in the format of FIG. 7A and determining the 12-bit frame sequence number L_SEQ, the RLP controller distinguishes and treats the received data frame as retransmitted data frame, new data frame, or duplicated frame, as when receiving the data frame of FIG. 6B or 6C over FCH.

The RLP controller 131 treats the received data frame in the format of 7B according to the NAK list 138 as shown in FIG. 4. As described above, each NAK entry of the NAK list 138 consists of the frame sequence number of a failing frame, indicator notifying a frame completely received, list notifying the received data part, retransmit timer, round counter, and identifier. The RLP controller 131 searches the NAK list 138 to detect the NAK entry having the same value as the value of the 8-bit SEQ field of the received retransmitted frame. If detecting such NAK entry, the frame sequence number of the NAK entry is set as the frame sequence number L_SEQ of the received frame. Otherwise, the RLP controller 131 discards the received frame.

Receiving the frame in the format of FIG. 7B, the RLP controller 131 set the 10 bit data sequence number L of the first byte of the data part of the received frame as the SEG field value. Then, the RLP controller 131 may calculate the data sequence numbers of the remaining data bytes based on the data sequence number L of the first data byte. Namely, the data sequence number of the last data byte is L+B−1 calculated by adding the data sequence number L and the size B of the received data part, and subtracting 1 from the addition. Of course, the other intermediate data bytes may be assigned with respective data sequence numbers obtained by adding one to the previous data sequence number.

Receiving the data frame in the format of FIG. 7B with the END field set to "1", the RLP controller 131 determines that there has come the last data byte of the retransmitted data part. In addition, the RLP controller 131 may get the information of the data part having been received until now from the list notifying the received data part in the NAK entry of the NAK list 138. Thus, receiving all the data bytes including the first and last data bytes, the retransmitted frame is processed with the completed data part and the frame sequence number L_SEQ, as when receiving the frame in the format of FIG. 6B or 6C. Alternatively, not receiving all the data bytes, the RLP controller 131 registers the received data in the list notifying the received data part in the NAK entry searched out from the NAK list 138.

If the MUX/DEMUX controller 140 informs the RLP controller 131 of the reception of a disrupted RLP frame, the RLP controller 131 increases the value of the E register 137. If the increased value of the E register 137 becomes greater 255, the RLP controller 131 performs the reset procedure. Or otherwise, if receiving a correct RLP frame, the RLP controller 131 resets the value of the E register 137 to 0.

E. Operation of the RLP Controller 131 after Receiving Data.

After treating all the received frames, the RLP controller 131 determines whether the retransmission request should be made for each NAK entry of the NAK list 138 or the retransmission is not waited. In the present description, it is called "a single round" that the receiving RLP controller waits the coming of the retransmitted data frame after requesting the transmitting RLP controller for a predeter mined time. Namely, a single round is completed if a predetermined time elapses after transmitting the NAK frame containing the retransmission request or the requested frame comes. In a single round, the retransmission request may be included in a plurality of continuous NAK frames. It is determined by the base station RLP controller what number of rounds the RLP controller performs before giving the reception of the data or what number of NAK frames are provided with the retransmission request for each round.

If it is considered that a new data frame or no data frame is received from the transmitting RLP controller, the RLP controller 131 performs the following steps with all NAK entries sequentially starting from the most long-standing NAK entry:

First, if the retransmit timer of the NAK entry is not terminated after setting, and the identifier stored in the NAK entry is included in a number of NAK frames designated by the base station RLP controller, the RLP controller 131 decreases the value of the retransmit timer of the NAK entry by one.

Second, if the value of the retransmit timer is decreased to "0", the RLP controller 131 decreases the round counter of the NAK entry. In this case, if the indicator notifying the complete reception of the frame of the NAK entry represents the complete reception of the entire data waited, the RLP controller 131 deletes the NAK entry from the NAK list 138.

Third, alternatively, if the indicator notifying the complete reception of the frame of the NAK entry represents incomplete reception of the entire data waited, and the round counter of the NAK entry is "0", the RLP controller 131 sequentially transfers the received data part stored in the list notifying the received data part stored in the NAK entry to the receiving data buffer 124, considering that the frame data waited has not been received. The RLP controller 131 sequentially transfers the data stored in all the rearranging buffer entries sequentially assigned with the frame sequence numbers starting from the rearranging buffer entry having the frame sequence number determined by the remainder after dividing the addition of the value of the L_V(N) register 136 and one by $2^{12}$, and deletes the rearranging buffer entries from the rearranging buffer 138. Assuming that the frame sequence number of the last rearranging buffer entry among the deleted rearranging buffer entries be L, the RLP controller 131 sets the value of the L_V(N) register 136 with the value of the remainder after dividing L+1 by $2^{12}$, and then deletes the NAK entry from the NAK list 138.

Fourth, alternatively, if the indicator notifying the complete reception of the frame of the NAK entry represents incomplete reception of the frame data waited, and the round counter of the NAK entry is not "0", the RLP controller 131 adjusts the value of the retransmit timer of the NAK entry, and includes the identifier of the NAK entry in a number of NAK frames designated by the base station RLP controller.

The RLP controller 131 performs the following steps with each of all the ANK entries added to the NAK list:

First, the round counter of the NAK entry is set with the value designated by the base station RLP controller.

Second, the identifier of the NAK entry is set with the value of the L_V(RS) register 141. The RLP controller 131 sets the L_V(RS) register 141 to the value of the remainder after dividing the addition of the value of the L_V(RS) register 141 and one by $2^8$.

Third, the RLP controller sets the retransmit timer of the NAK entry to a suitable value, and includes the identifier of the NAK entry in a number of NAK frames designated by the base station RLP controller in the first round. Fourth, if the number of the NAK entries contained in the NAK list 138 exceeds 256, the resetting steps described above are performed.

Thus, there is provided an improved method for retransmitting a failing data frame according to RLP by employing the identifier, enhancing the transmission efficiency. While the present invention has been described in connection with specific embodiments accompanied by the attached drawings, it will be readily apparent to those skilled in the art that various changes and modifications may be made thereto without departing the gist of the present invention.

What is claimed is:

1. A method for requesting retransmission of a failing RLP (Radio Link Protocol) frame in a communications system that transmits a plurality of RLP frames, each frame having a frame sequence field for a frame sequence number, a data field for data, the method comprising the steps of:

receiving a next RLP frame and storing the frame sequence number of the failing RLP frame in the frame sequence field of said next RLP frame; and transmitting a retransmission request frame containing the frame sequence number of said failing RLP frame and an identifier different from said frame sequence number, whereby the retransmitted RLP frame includes said identifier in the frame sequence field.

2. An apparatus for requesting retransmission of a failing RLP frame in a communications system that transmits a plurality of RLP frames, each frame having a frame sequence field for a frame sequence number, a data field for data, and a retransmission field for retransmission, comprising:

a list for storing the frame sequence number of the failing RLP frame when receiving an RLP frame subsequent to the failing RLP frame; and a controller for generating a retransmission request frame containing the frame sequence number of said failing RLP frame and an identifier different from said frame sequence number, wherein the retransmitted RLP frame stores said identifier in the frame sequence field.

3. The apparatus as claimed in claim 2, further comprising a register for storing said identifier and said frame sequence number.

4. A method for retransmitting a failing RLP frame in a communications system that transmits a plurality of RLP frames, each frame having a frame sequence field for a frame sequence number, a data field for data, and a retransmission field for retransmission, comprising the steps of:

receiving a retransmission request frame containing a frame sequence number of the failing RLP frame, and an identifier different from said frame sequence number; and transmitting a retransmitted RLP frame with said identifier stored in said frame sequence field.

5. A method for retransmitting an RLP frame in a communications system that transmits a plurality of RLP frames, each frame having a frame sequence field for a frame sequence number, a data field for data, and a retransmission field for retransmission, comprising the steps of:

storing said plurality of transmitted RLP frames and the respective frame sequence numbers of said transmitted RLP frames in a storage device;

detecting the frame sequence number of a failing RLP frame in response to a retransmission request for requesting retransmission of said failing RLP frame with an identifier different from said frame sequence number stored in said frame sequence field; and transmitting a retransmitted RLP frame with said identifier assigned to the frame sequence field of the detected frame sequence number, and retransmission indicated in said retransmission field.

6. An apparatus for retransmitting a failing RLP frame in a communications system that transmits a plurality of RLP frames, each frame having a frame sequence field for a frame sequence number, a data field for data, and a retransmission field for retransmission, comprising:

a forward resequencing buffer for storing the data of said transmitted RLP frames, and the respective frame sequence numbers of said transmitted RLP frames for retransmission; and a controller for generating a retransmitted RLP frame with an identifier assigned to said frame sequence field, and retransmission indicated in said retransmission field by detecting the RLP frame identified by the frame sequence number of said failing RLP frame in response to a retransmission request frame containing the frame sequence number of said failing RLP frame and said identifier.

7. The apparatus as claimed in claim 6, further comprising a transmission request queue for storing the frame sequence number of said failing RLP frame and said identifier contained in said retransmission request frame.

\* \* \* \* \*